United States Patent
Shimizu

(10) Patent No.: US 8,547,804 B2
(45) Date of Patent: Oct. 1, 2013

(54) THERMALLY-ASSISTED RECORDING HEAD AND MAGNETIC RECORDING SYSTEM

(75) Inventor: Junichiro Shimizu, Hadano (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 13/216,901

(22) Filed: Aug. 24, 2011

(65) Prior Publication Data

US 2012/0051195 A1 Mar. 1, 2012

(30) Foreign Application Priority Data

Aug. 30, 2010 (JP) .................. 2010-192115

(51) Int. Cl.
*G11B 11/00* (2006.01)
(52) U.S. Cl.
USPC ............ 369/13.32; 369/13.13; 369/13.17
(58) Field of Classification Search
USPC ............ 369/13.13, 13.32, 13.33, 59, 13.02, 369/13.17, 13.24; 360/59
See application file for complete search history.

(56) References Cited

U.S. PATENT DOCUMENTS

| 8,385,162 B2 * | 2/2013 | Rosen et al. ............ 369/13.33 |
| 2006/0093262 A1 * | 5/2006 | Matsumoto et al. ......... 385/31 |
| 2006/0187564 A1 | 8/2006 | Sato et al. |
| 2008/0056073 A1 | 3/2008 | Shimizu |
| 2008/0204916 A1 * | 8/2008 | Matsumoto et al. .......... 360/59 |
| 2009/0052833 A1 * | 2/2009 | Yang et al. .................. 385/14 |

FOREIGN PATENT DOCUMENTS

| JP | 2006-185548 | 7/2006 |
| JP | 2007257753 A | 10/2007 |
| JP | 2008-059691 | 3/2008 |
| JP | 2008059645 A | 3/2008 |
| JP | 2008059691 A | 3/2008 |
| JP | 2010049735 A | 3/2010 |

\* cited by examiner

*Primary Examiner* — Thang Tran

(74) *Attorney, Agent, or Firm* — Volpe and Koenig, P.C.

(57) ABSTRACT

In a magnetic recording head including an optical waveguide for guiding a laser beam to a surface of a magnetic recording medium, a shield is provided in the vicinity of at least one portion changing discontinuously in structure of the optical waveguide to absorb or reflect non-propagating light leaking from the discontinuous portion to the outside of the optical waveguide.

4 Claims, 10 Drawing Sheets

PRIOR ART

PRIOR ART

TRACK WIDTH DIRECTION

THERMALLY-ASSISTED RECORDING HEAD AND MAGNETIC RECORDING SYSTEM

The present application claims priority from Japanese application serial No. 2010-192115, filed on (Aug. 30, 2010), the content of which is hereby incorporated by reference into this application.

BACKGROUND OF THE INVENTION

1. Field of the Invention

The present invention relates to a thermally-assisted recording head for assisting magnetic recording with heat caused by a laser beam, and a magnetic recording system using the thermally-assisted recording head.

2. Description of the Related Art

A higher recording density is demanded of a magnetic disk device mounted in a computer, etc. as one of the information recording devices, in order to store a large amount of information without enlarging the device. In order to achieve a higher recording density in a magnetic disk device, a recording medium with high coercivity is used because of the necessity to stabilize minute recording bits. To record a recording medium with high coercivity, it is necessary to concentrate high magnetic field strength on a micro region. However, this is difficult technically.

As a technology for addressing the aforementioned problem, a hybrid recording technology combining an optical recording technology and a magnetic recording technology has been considered to be one effective way. The coercivity of the medium is decreased by heating the medium with a laser beam up to the vicinity of the Curie temperature (about several hundreds of degrees centigrade) of the medium (ferromagnetic) concurrently with an applied magnetic field when recording. As a result, recording becomes easier on a recording medium with high coercivity where recording has been difficult with a related art magnetic head because of insufficient recording magnetic field strength. A magnetoresistance effect used for a related art magnetic recording is used for reading. This hybrid recording method is called thermally-assisted magnetic recording or optically-assisted magnetic recording.

In this thermally-assisted magnetic recording method, a laser beam for heating the medium is guided to the recording head. A semiconductor laser diode (hereinafter referred to as LD) which is small in size and low in power consumption is used for a laser source because of the necessity to use it in a magnetic disk device package. In the thermally-assisted magnetic recording, it is necessary to efficiently guide a beam generated by a semiconductor laser to the tip of the head, that is, to decrease propagation loss. Examples of the structure for fulfilling this demand include the following. Japanese Published Unexamined Patent Application No. 2008-59645 discloses a head that is mounted with a horizontal cavity vertical emitting LD with a reflector monolithically integrated, and in which an optical waveguide and a near-field generator are integrated inside a slider. Japanese Published Unexamined Patent Application No. 2008-59691 discloses a head that is mounted with an edge emitting short cavity LD, and in which, in the same manner as the foregoing, an optical waveguide and a near-field generator are integrated inside a slider. Japanese Published Unexamined Patent Application 2010-49735 discloses a head in which an optical waveguide is integrated inside a slider.

In optical device integrated heads for thermally-assisted magnetic recording as disclosed in the above-described Japanese Published Unexamined Patent Application Nos. 2008-59645, 2008-59691, and 2010-49735, laser beams emitted from a semiconductor laser pass through the optical waveguide provided in the slider to be guided to an air bearing surface (ABS: Air Bearing Surface) of the slider. When the beams from the LD enter an upper surface of the slider to be coupled to the optical waveguide, an optical coupling loss is generated, and there are inevitably some beams which do not become a propagating mode. These beams, which do not become the propagating mode, normally become a radiation mode, and disappear somewhere. However, in a case where there are internally plural structures, such as the slider of the magnetic head, which are nontransparent to the laser beam, or there is a reflecting surface such as a trailing edge of the head, light in the radiation mode might be reflected by such structures or reflecting surface and stray around in the slider without disappearing. This light is referred to as stray light. Coupling of the stray light to the optical waveguide is likely to cause interference with light in the propagating mode. The interference between light beams different in phase causes instability of the light mode, resulting in spatial and temporal fluctuation in the intensity and the mode spot. This instability of the mode causes instability in the supply of laser beams to the near-field generator provided in the vicinity of the ABS, thereby leading to instability in the near-field light to be generated and instability in the amount of heat required for recording onto a recording medium. As a result, an expected thermal assisting cannot be achieved, and magnetic recording becomes impossible.

Therefore, preventing generation of such stray light or eliminating stray light is an important issue in stable thermally-assisted recording.

Hereinafter, generation of stray light will be described by using a specific structure of the magnetic head. In the thermally-assisted magnetic recording heads disclosed in the Japanese Published Unexamined Patent Application Nos. 2008-59645 and 2008-59691, in order to reduce optical loss, optical components are mutually integrated, thereby minimizing the number of coupling points requiring optical coupling. Also, a light path from a light source to a recording medium is shortened so as to reduce optical loss.

However, even if the number of optical coupling portions is reduced, the coupling loss of waveguide light is caused when light passes through the coupling points between components, thereby causing attenuation of the intensity of the waveguide light. The semiconductor LD is generally made of a compound semiconductor with GaAs, GaN, or InP as a substrate material. On the other hand, the slider of the magnetic head is made of Al—Ti—C and $Al_2O_3$ as a sintered body of $Al_2O_3$ and TiC, and magnetic metal. Therefore, the semiconductor LD and the slider cannot be the same component, and these are separate components. Consequently, a coupling portion inevitably exists between the semiconductor LD and the slider, and hence the optical loss is caused when light passes through the coupling portion. Lost light does not propagate through the optical waveguide of the slider. Some of produced loss light is reflected by an upper surface of the slider, that is, a light incidence plane to return toward the semiconductor LD. The rest of the loss light enters the upper surface of the slider, however, does not propagate through the optical waveguide. Commonly, light not propagating through the optical waveguide is radiated outside the slider other than through the optical waveguide or absorbed by a structure provided in the slider, and disappears. However, some of the light strays around in the slider and becomes stray light. The stray light is reflected by a structure in the slider or a surface of the slider and might be indirectly coupled to the optical waveguide. The optical coupling of stray light to the optical waveguide provided in the slider causes optical interference with the waveguide light directly coupled to the optical waveguide and propagating therethrough from the semiconductor LD. Since there is a difference in light path between these light beams, their phases are different. Further, the interference state spatially and temporally varies depending on different conditions such as temperature. When interference occurs, a designed waveguide light mode becomes difficult to forecast. Further, the mode temporally fluctuates, causing instability in the mode of the light to be supplied to the near-field generator.

Such instability in the light to be supplied causes instability in the near-field light to be generated by the near-field generator, thereby preventing the amount of heat required for thermally-assisted recording from being controlled and transmitted to a recording medium. As a result, magnetic recording state instability is caused. Therefore, stray light needs to be eliminated in order to ensure the stable supply of the amount of heat to the recording medium. As described above, the stray light causes not only the optical loss, but also the interference with the propagating-mode light propagating through the optical waveguide, resulting in instability in its original propagating mode because the stray light is different in phase from the propagating light mode. The stray light is a known phenomenon in optical disk drives, waveguide devices for optical networking or the like. In these fields, since light is not allowed to propagate through a structure, such as a slider, internally including a minute structure, there are not many cases where the light lost without being coupled to the optical waveguide becomes stray light. Also, even if stray light occurs, it seems to be easy to identify a reflector that causes the stray light because of their relatively simple structures, and take measures to prevent generation of the stray light.

However, in the thermally-assisted magnetic recording heads, as disclosed in Japanese Published Unexamined Patent Application Nos. 2008-59691 and 2010-49735, the slider is a structure having a size of about several hundreds of microns, with an optical waveguide added to a related art head structure. The optical waveguide is disposed at a position close to a trailing edge of the slider, several tens of microns therefrom. Moreover, a recording magnetic pole, a coil for magnetizing the magnetic pole, a read sensor, a floating height control heater, wiring for supplying power thereto and the like are complexly disposed in the vicinity of the optical waveguide, thereby creating a situation in which light non-coupled to the optical waveguide is reflected and likely to become stray light.

FIG. 1 is an exemplary sectional view of the vicinity of a thermally-assisted magnetic recording head of a magnetic disk device according to the related art.

A horizontal cavity vertical emitting semiconductor LD100, in which a reflecting mirror 104 formed with a 45-degree tapered surface is monolithically integrated, is mounted over a slider 110. A laser beam emitted from the semiconductor LD100 becomes a waveguide light 204, and the waveguide light 204 passes through an optical waveguide 111 provided in the slider 110 to a magnetic recording medium (a magnetic disk) 120. The light path is indicated by the arrows.

In the horizontal cavity vertical emitting semiconductor LD100, a laser beam produced by an active layer 101 is reflected by the reflecting mirror 104. A reflected laser beam 201 reaches perpendicular to the surface of the horizontal cavity vertical emitting semiconductor LD100 on the side on which the slider 110 is located, and exits therefrom.

The laser beam 201 exiting from the surface of the LD100 on the side on which the slider 110 is located reaches an upper surface of the slider 110 and enters the optical waveguide 111 provided in a manner penetrating the slider 110 in a thickness direction of the slider 110. A thin antireflection film 119 is provided on an upper surface (the upper surface of the optical waveguide 111) of the slider 110, thereby preventing optical loss due to reflection and preventing reflected return light to the LD100. In this case, in addition to the loss due to reflection, coupling loss occurs if there is a difference in the natural mode-field shape of the light between the LD100 and the optical waveguide 111 that is provided in a manner penetrating the slider 110 in a thickness direction of the slider 110. Also, even if there is no difference in the natural mode-field shape therebetween, coupling loss occurs if there is a space between the light exit surface of the LD100 and the upper surface of the slider 110.

Actually, it is impossible to equalize the light mode-field sizes between the LD100 and the optical waveguide 111 since respective materials and structures making up the LD100 and the optical waveguide 111 are different. Also, it is almost impossible in terms of mounting technology to couple the LD100 and the optical waveguide 111 without space therebetween.

Therefore, an optical loss inevitably occurs in an optical coupling point between the LD100 and the optical waveguide 111. Light entering the slider 110 and non-coupled to the optical waveguide 111 preferably disappears, for example after passing through the slider 110 to the outside, or being absorbed by metal in the slider 110. However, this light is reflected by various structures existing in the slider 110 or a trailing edge surface of the slider 110 and likely to become stray light. The stray light might be unexpectedly coupled to the optical waveguide 111. Interference between the waveguide light 204 propagating through the optical waveguide 111 and the stray light causes irregularities in the field of the waveguide light 204, leading to instability in the supply of light. This can result in deterioration of the stability behavior of a thermally-assisted mechanism. Consequently, a mechanism for preventing generation of stray light, or eliminating or reducing generated stray light is necessary.

Furthermore, the optical waveguide 111 may have the function of converting an incident laser beam into a small spot size in the slider 110. Light with a spot size reduced in the optical waveguide 111 is projected on a near-field generator 115. Typically, the spot diameter of the light generated by the LD100 is in a range of about 2 to 4 μm, and the size of the near-field generator 115 is in a range of about 100 to 300 nm. Therefore, the light spot needs to be reduced to about one fifth to one tenth the size during propagation through the optical waveguide 111. Otherwise, sufficient light is prevented from being supplied to the near-field generator 115, leading to significant reduction in the light conversion efficiency. In view of this, a spot size converting waveguide is used to rapidly reduce the size of the light spot while propagating through the slider 110. The spot size converting waveguide is disclosed, for example in Japanese Published Unexamined Patent Application No. 2007-257753. The spot size converting waveguide rapidly reduces the light field spot size. Typically, such rapid reduction in light field spot size causes optical loss, and the spot size converting waveguide is therefore designed to minimize the optical loss.

However, since the loss caused upon reduction of the light field spot size cannot be completely eliminated, the optical loss occurs. The lost light is radiated outside the optical waveguide 111, and thus likely to become stray light in the slider 110. Therefore, the stray light generated by the spot size converting waveguide also needs to be eliminated.

FIG. 2 is an exemplary sectional view of the vicinity of a thermally-assisted magnetic recording head with a horizontal cavity edge emitting semiconductor LD 10 as a light source, unlike FIG. 1. Even when a popularized horizontal cavity edge emitting semiconductor LD is used as a light source, the phenomenon caused by optical coupling due to mounting of the slider 110 and the light source is exactly the same as FIG. 1.

As described above, on the light path from the LD to the recording medium 120, there are two major points at which stray light might occur.

When optical coupling or light spot size conversion is performed, it is impossible to completely eliminate light radiation caused by optical loss. Therefore, how to suppress the generation of stray light has become an important issue. Consequently, it is necessary to eliminate or reduce possibly becoming stray light at each stray light generation point. Accordingly, an object of the present invention is to realize a thermally-assisted magnetic recording head including a slider with a mechanism for suppressing generation of stray light, in which stability of a thermally-assist mechanism is realized and the recording performance of a magnetic disk device is improved.

SUMMARY OF THE INVENTION

The present inventors propose a structure for eliminating light in a mode other than that of light for propagating through an optical waveguide, and suppressing generation of stray light.

According to an aspect of the present invention, there is provided a thermally-assisted magnetic recording head including a shield that is provided at a point of generation of light that is non-coupled to and not propagating through an optical waveguide and likely to become stray light for eliminating by absorption or reflection the non-coupled and non-propagating light. Thus, generation of stray light is suppressed.

The shield, serving as a laser beam absorber or reflector, is preferably made of metal. However, the shield material is not limited thereto. Any material may be used as long as it has a similar function.

The shield needs to be designed to eliminate only the non-coupled and non-propagating light without preventing propagation of light coupled to the optical waveguide. Therefore, the shield is preferably disposed outwardly of a mode field of the optical waveguide so as to prevent interference with the mode field. Thus, the shield is brought into contact with a cladding layer surrounding the periphery of an optical waveguide core. The refractive index in the core is larger than that in the cladding layer.

Light not coupled to the optical waveguide, that is, leaking light, is generally generated in all four directions, up, down, left, and right with respect to the direction of travel of the light in the optical waveguide. Therefore, the shield is preferably disposed in the four directions outside the optical waveguide. It should be noted that shields may be separately disposed in the four directions or alternatively, an annular shield surrounding the cladding layer may be used.

It is effective if the shield is disposed at a point of occurrence of optical loss possibly causing stray light. Specifically, a vicinity of an optical waveguide incident port in the slider, and a spot-size converting waveguide are the places where the non-propagating light possibly becoming stray light is likely to be generated. It is therefore considered to be highly effective if the shield is disposed in the vicinity of a changing discontinuously portion in structure of the optical waveguide, such as the vicinity of the optical waveguide incident port or the vicinity of the end of the spot-size converting waveguide.

In a case where another structure has a function of eliminating stray light, the shield may be used together. However, it becomes less effective unless the shield is disposed in an optimum place. Preferably, therefore, a special shield is disposed. For example, the above-described Japanese Published Unexamined Patent Application No. 2008-59691 discloses that the coil for magnetizing the recording magnetic pole has such function. However, the coil is disposed in the vicinity of the air bearing surface of the slider, apart from the point where the non-propagating light possibly becoming stray light is generated. This is less effective in eliminating or reducing the non-propagating light. Furthermore, electric current called photocurrent is generated in metal with stray light absorbed therein. This photocurrent increases with an increase in the amount of generated stray light. There is concern that, if a terminal is connected to a device requiring electrical control, it adversely affects its behavior. Consequently, in view of this, preferably, a special light shield is disposed.

Although it has been described that the shield is preferably disposed in the four directions outside the cladding of the optical waveguide, stray light is not always equally likely to be generated in the respective four directions. For example, a mode field of an incident laser beam and the natural mode-field of the optical waveguide in the slider are different in the degree of a field mismatch between a vertical direction perpendicular to a medium surface and a lateral direction corresponding to a track width direction. Moreover, the field mismatch might increase due to mounting misalignment of optical axes of the semiconductor LD and the optical waveguide. Therefore, the vertical and lateral shields may be arbitrarily varied in thickness.

Also, the frequency of generation of stray light varies depending on the layout of structures existing in the vicinity of the optical waveguide. Therefore, the shields may be asymmetrical according to the direction.

As described above, by eliminating or reducing the non-propagating light that is generated in the vicinity of the changing discontinuously portion in structure of the optical waveguide and likely to become stray light, it is possible to prevent the instability of propagating light caused by interference with stray light, and realize the stability behavior of a thermally-assist mechanism of the thermally-assisted magnetic recording head.

According to an aspect of the present invention, the generation of stray light in the slider can be suppressed, and the stable supply of light contributing to the thermally-assist mechanism can be realized. As a result, it is possible to realize the magnetic recording head in which stable thermal assisting is provided. Also, it is possible to stabilize the behavior of the magnetic disk device and improve the recording accuracy.

DESCRIPTION OF PREFERRED EMBODIMENTS

Figure 1:
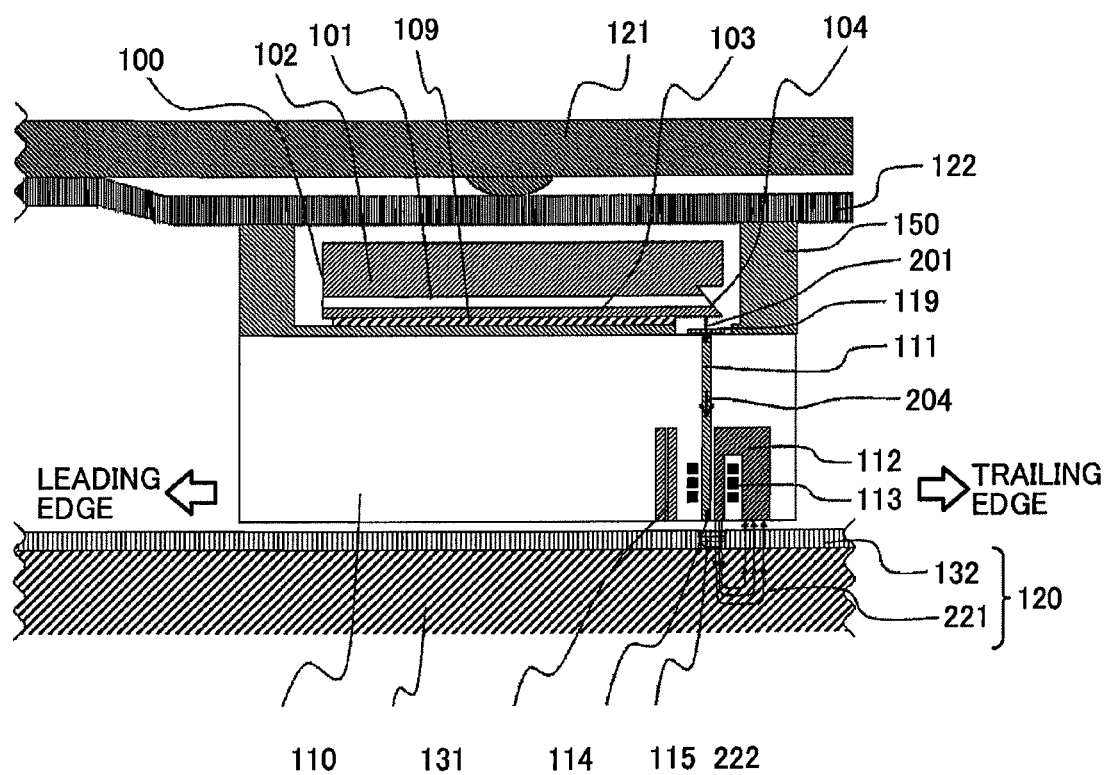
FIG. 1 is a schematic enlarged sectional view of the vicinity of a thermally-assisted magnetic recording head of a magnetic disk device according to the related art.
Figure 2:
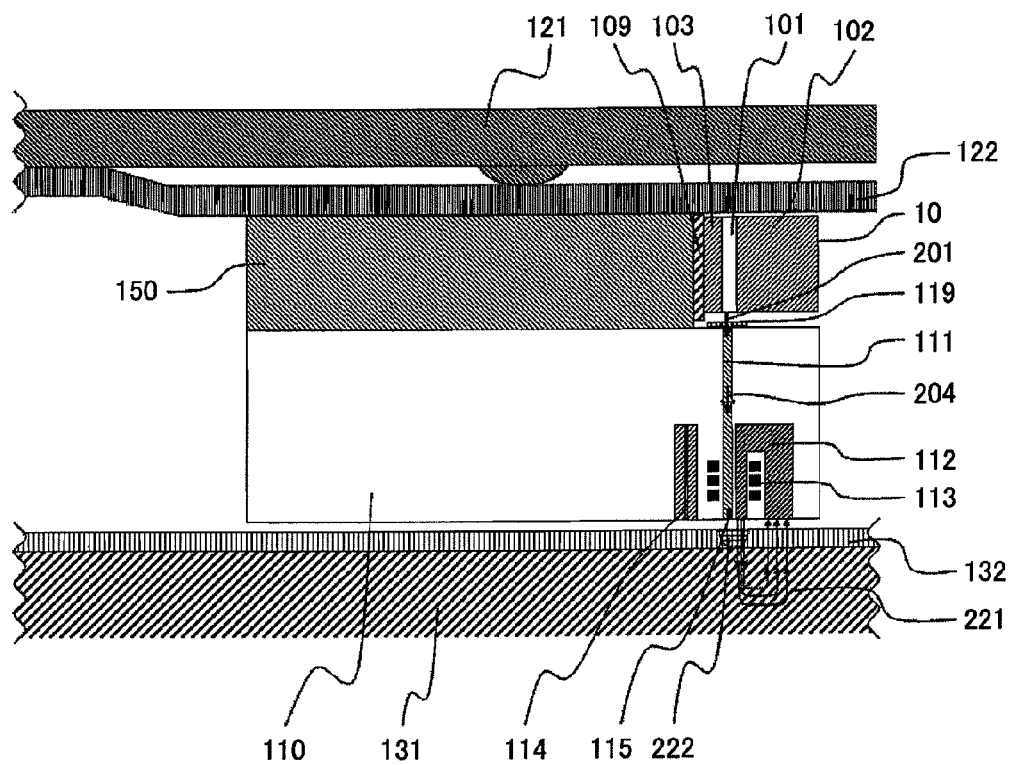
FIG. 2 is a schematic enlarged sectional view of the vicinity of a thermally-assisted magnetic recording head of a magnetic disk device according to the related art.
Figure 3:
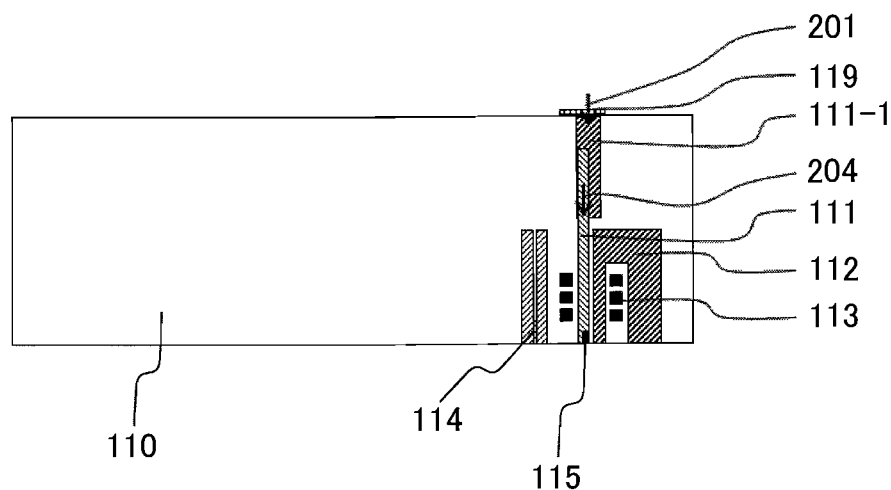
FIG. 3 is a schematic enlarged sectional view of a slider internally including a spot-size converting waveguide, used in a thermally-assisted magnetic recording head of a magnetic disk device according to the related art.
Figure 4:
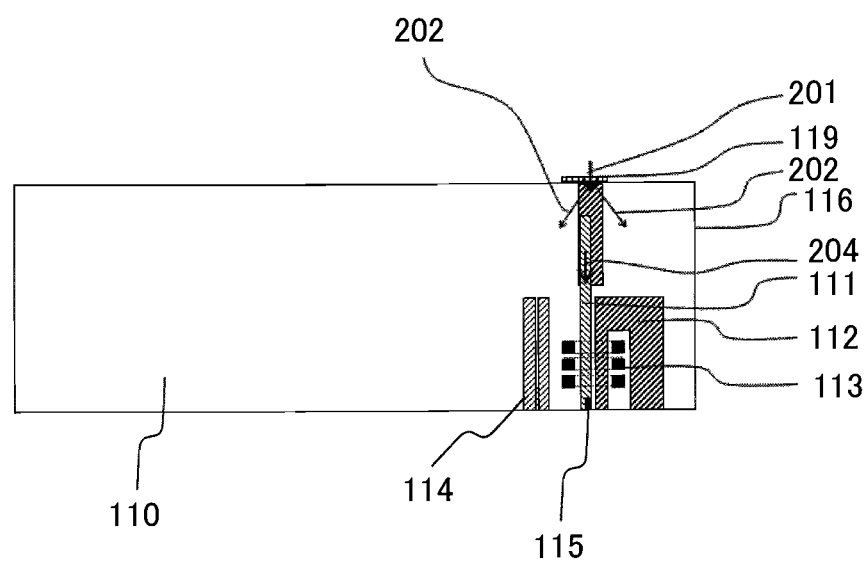
FIG. 4 is a schematic enlarged sectional view showing a state in which light non-coupled to an optical waveguide is radiated from the waveguide in the vicinity of an incident port of the optical waveguide in a slider used in a thermally-assisted magnetic recording head according to the related art.
Figure 5:
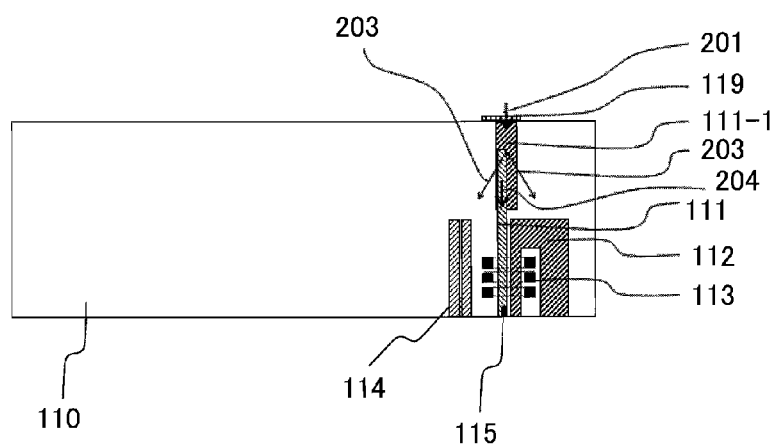
FIG. 5 is a schematic enlarged sectional view showing a state in which lost and leaking light is radiated from a spot-size converting waveguide in a slider used in a thermally-assisted magnetic recording head according to the related art.

FIGS. 3, 4, and 5 are each an enlarged sectional view of a slider of a thermally-assisted magnetic recording head of a magnetic disk device according to the related art. Although an actual slider has a complicated internal structure, the structure is simplified in each figure.

In FIG. 3, a light 201 entering an upper surface of a slider 110 is optically coupled to an optical waveguide 111 provided in the slider 110 and becomes a waveguide light 204, and then the waveguide light 204 propagates through the optical waveguide 111. In FIG. 4, a lost light 202 in coupling is radiated without being coupled to the optical waveguide 111.

FIG. 5 shows a case where a spot-size converting waveguide is provided. When propagating light is reduced in spot size while propagating from the spot-size converting waveguide to the optical waveguide, a leaking light 203 is radiated outside the optical waveguide.

The non-propagating lights 202 and 203 might become stray light. If the stray light is re-coupled to the optical waveguide 111, causing optical interference between the stray light and the propagating light, a problem occurs. Therefore, a structure becomes necessary to eliminate or reduce the non-propagating lights 202 and 203.

Figure 6:
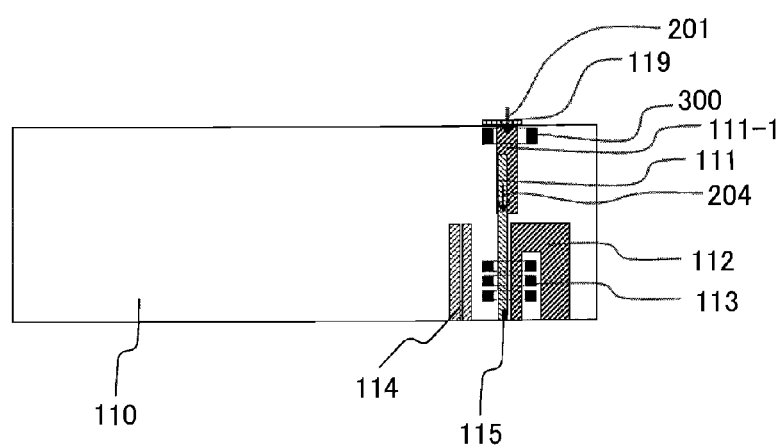
FIG. 6 is a schematic enlarged sectional view of a slider, with a light shield provided in the vicinity of an optical waveguide incident port, of a thermally-assisted magnetic recording head according to an embodiment of the present invention.
Figure 7:
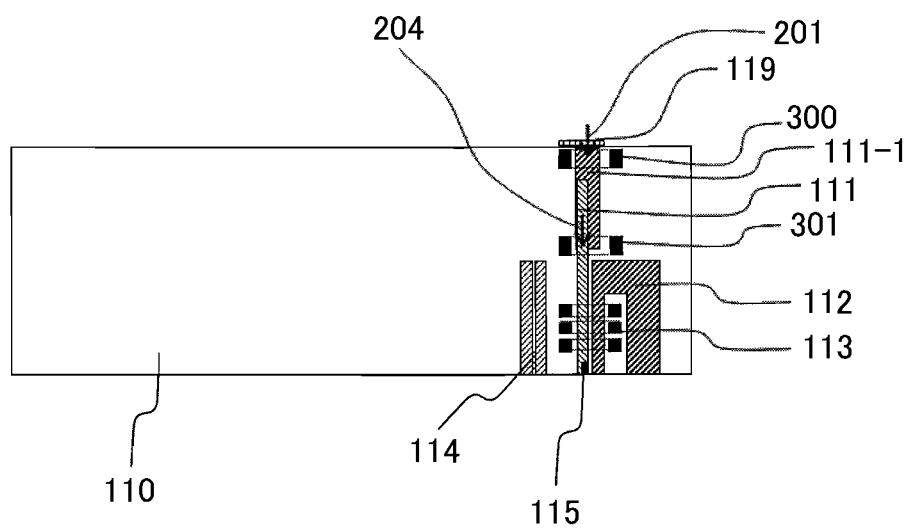
FIG. 7 is a schematic enlarged sectional view of a slider, with light shields provided in the vicinity of an optical waveguide incident port and at the end of a spot-size converting waveguide, of a thermally-assisted magnetic recording head according to an another embodiment of the present invention.

FIG. 6 shows a slider of a thermally-assisted magnetic recording head according to an embodiment of the present invention. In this embodiment, in order to eliminate the non-propagating light 202, there is provided a structure in which a light shield 300, serving as a laser beam absorber or reflector, is disposed in the vicinity of an incident port of the light waveguide 111. The light shield 300 is made of a material, such as metal, nontransparent to the propagating light. In the case of the light shield 300 serving as an absorber, the thickness of the light shield 300 is important. In the case of the light shield 300 serving as a reflector, the surface of the light shield 300 is important. FIG. 7 is a slider of a thermally-assisted magnetic recording head according to an another embodiment of the present invention. The optical waveguide 111 serves as the spot-size converting waveguide 111-1. In this embodiment, in order to eliminate the non-propagating light 202, there is provided a structure in which the light shield 300 serving as a laser beam absorber or reflector is disposed in the vicinity of an incident port of the light waveguide 111. Additionally, in order to eliminate the non-propagating light 203, there is provided a structure in which a light shield 301 serving as a laser beam absorber or reflector is disposed in the vicinity of the end of a spot-size converting waveguide core 111-1. In other words, as shown in FIG. 6 or 7, the shield 300 or 301 eliminates or reduces the non-propagating light that occurs in the vicinity of a portion changing discontinuously in structure of the optical waveguide 111 and is likely to become stray light.

Figure 8:
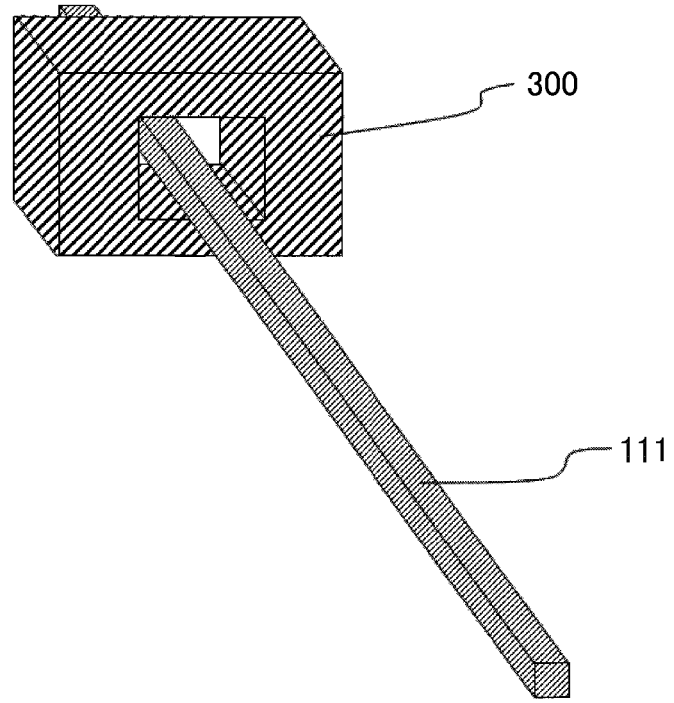
FIG. 8 is a schematic perspective view of an optical waveguide core and an annular shield in a slider of a thermally-assisted magnetic recording head according to an another embodiment of the present invention.

FIG. 8 is a schematic perspective view showing the positional relationship between an optical waveguide core and a shield provided in a slider of a thermally-assisted magnetic recording head according to an another embodiment of the present invention. An optical waveguide core 111 is disposed in such a manner as to be surrounded by the annular light shield 300, serving as a laser beam absorber or reflector. Between the optical waveguide core 111 and the light shield 300, there is provided a cladding layer that surrounds the periphery of the optical waveguide core 111. There is no direct contact between the optical waveguide core 111 and the shield 300.

FIGS. 9A to 9E are each a schematic sectional view of an optical waveguide core, a cladding, and a light shield provided in a slider of a thermally-assisted magnetic recording head according to an another embodiment of the present invention.

Figure 9A:
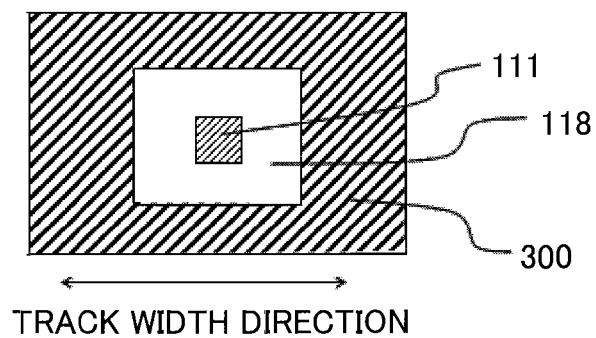
FIGS. 9A to 9E are each a schematic sectional view of an optical waveguide core and an annular shield in a slider of a thermally-assisted magnetic recording head according to an another embodiment of the present invention.

In FIG. 9A, the optical waveguide 111 is composed of the core 111, and a cladding 118 surrounding the core 111. A light mode is formed inside the core 111 and the cladding 118, and light propagates therethrough. The light shield 300 is provided outwardly of the cladding 118 in a manner surrounding the cladding 118. It should be noted that the light shield 300 needs to be located outwardly of the cladding 118 to such an extent as to prevent interference with the mode field of the propagating light.

Figure 9B:
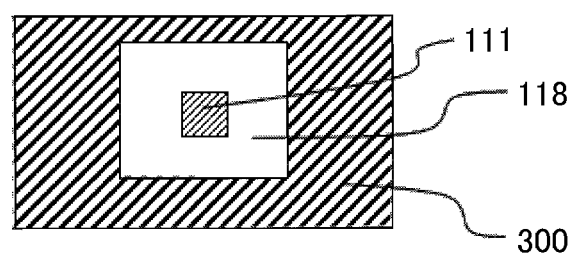
Figure 9C:
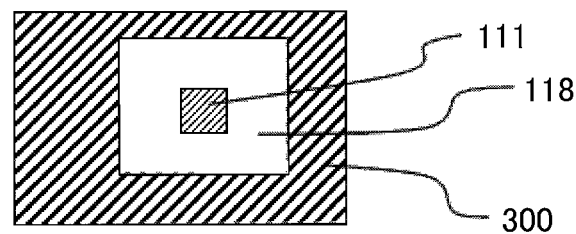
Figure 9D:
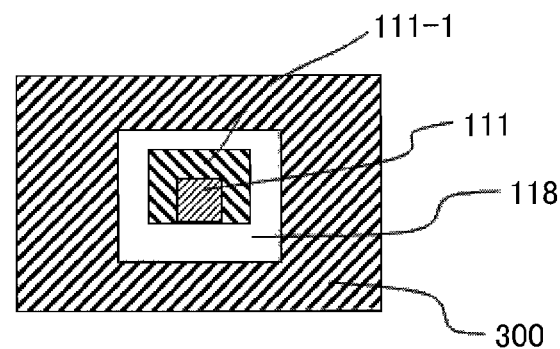
Figure 9E:
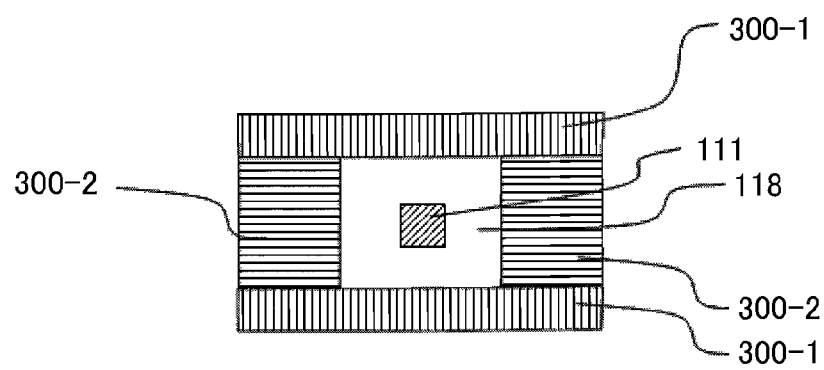

In FIGS. 9B and 9C, the cladding 118 is disposed in such a manner that its periphery is surrounded by the light shield 300 that is asymmetrical. According to the shape and position of the vicinity of the incident port shown in FIG. 6 or the spot size converting waveguide shown in FIG. 7, the generation amount of non-propagating light often varies depending on the direction. Therefore, the thickness in respective directions of the shield 300 may be changed depending on the generation amount of non-propagating light. FIG. 9D shows a case where the spot-size converting waveguide core 111-1 is provided in contact with the upper, right, and left sides of the converting waveguide core 111, in which the light shield 300 is disposed outwardly of the cladding 118 surrounding the core 111-1 in such a manner as to surround the core 111-1. It is more effective to increase the thickness of the shield 300 in an upper direction of the core 111 having a discontinuous portion in structure, relative to that of the shield 300 in a lower direction thereof. In FIG. 9E, the light shield 300, composed of materials that are different in the degree of absorption of light between a longitudinal 300-1 and a lateral 300-2, is disposed in such a manner as to surround the cladding 118. FIG. 9E is applied to a case where the degree of radiation of non-propagating light differs between horizontal and vertical directions of the figure. The light shield 300 may be composed of various kinds of materials such as different metals.

As described in the foregoing embodiments, the light shield 300, which is nontransparent to light, is disposed outwardly of the cladding 118 of the optical waveguide 111 composed of the core and the cladding 118, as close to the center as possible, in size to such an extent as to prevent interference with the mode field of light, thereby allowing elimination by absorption or reflection, or reduction of the non-propagating light that is likely to become stray light.

FIRST EXAMPLE

Figure 10:
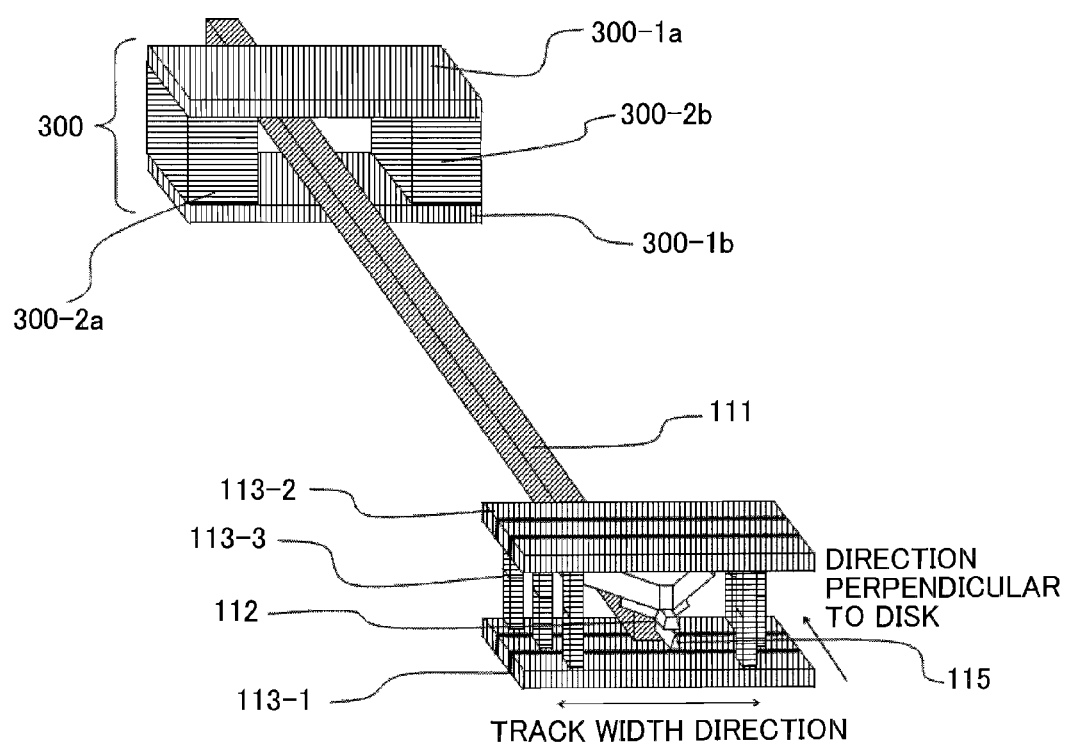
FIG. 10 is a schematic perspective view of an optical waveguide core and an annular shield in a slider of a thermally-assisted magnetic recording head according to an another embodiment of the present invention.

FIG. 10 is a schematic perspective view of an optical waveguide core and shield, a magnetic pole, a magnetizing coil, and a connecting terminal provided in a slider of a thermally-assisted magnetic recording head according to an another embodiment of the present invention. The optical waveguide core 111 is surrounded by the cladding 118. The annular light shield 300, serving as a laser beam absorber or reflector, is disposed in such a manner as to surround the periphery of the cladding 118. Also, a near-field generator 115 is disposed at a leading end of the optical waveguide core 111. The light propagating through the optical waveguide 111 is projected on the near-field generator 115 to be absorbed. A recording magnetic pole 112 is disposed in the vicinity of the near-field generator 115 to generate a recording magnetic field. The near-field light generated by the near-field generator 115 locally raises the temperature of a recording medium, and recording is performed in a thermally-assisted state by using the near field generated by the recording magnetic pole 112.

A magnetizing coil 113 is disposed around the magnetic pole 112. The magnetizing coil 113 has a helical conformation, and is composed of a lower coil 113-1, an upper coil 113-2, and a terminal 113-3 for connecting the upper and lower coils 113-2 and 113-1. The light shield 300 is composed of upper and lower shields 300-1a, b, and left and right shields 300-2a, b, which are interconnected and disposed in such a manner as to surround the optical waveguide 111.

The light shield 300 needs to be made of a material nontransparent to a laser beam to be used. However, in wafer processing of a magnetic head, the light shield 300 may be prepared by using the same lamination layer as that of the magnetizing coil 113 since its layer has the same height as that of the magnetizing coil 113 with respect to the optical waveguide. In this case, the lower shield 300-1b may be prepared by using the lower coil 113-1, and the upper shield 300-1a may be prepared by using the upper coil 113-2. A metal, Cu is generally used for coil layers. The lateral shields 300-2a, b may be formed by using the same layer of that of the coil connecting terminal 113-3. In this manner, the light shield 300 may be secondarily and readily formed without using a special process for preparing the light shield 300.

SECOND EXAMPLE

Figure 11:
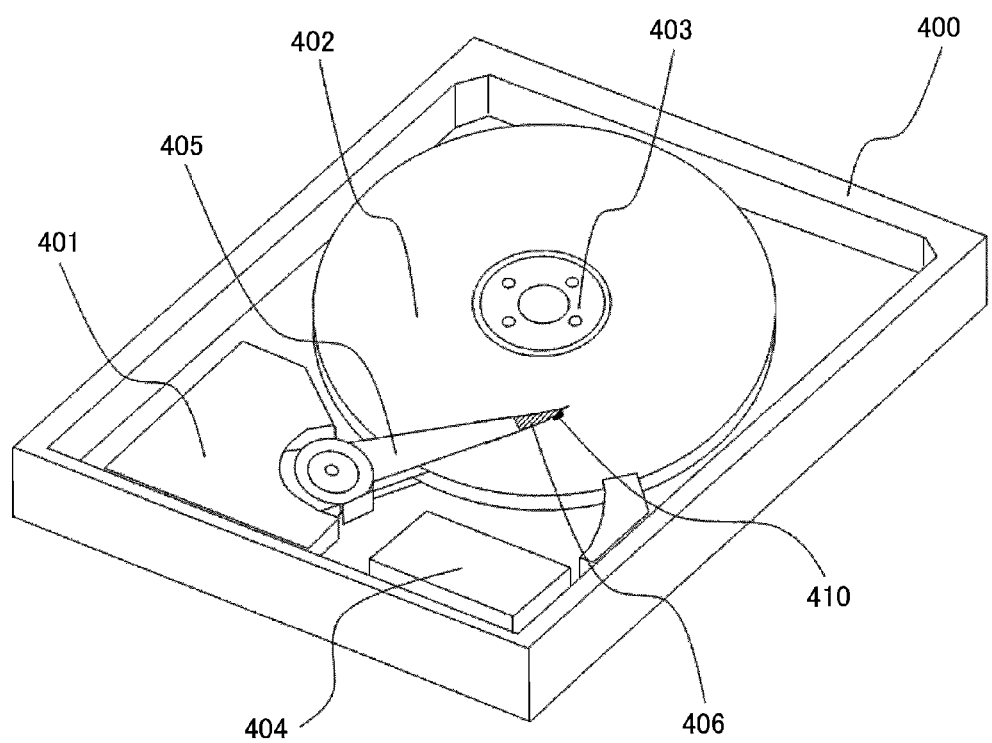
FIG. 11 is a schematic perspective view of a magnetic disk device using a thermally-assisted magnetic recording head according to an another embodiment of the present invention.

FIG. 11 is a schematic perspective view of a magnetic disk device using a thermally-assisted magnetic recording head according to an another embodiment of the present invention. A recording disk 402 rotates within a device case 400 with a spindle 403. An arm 405 is driven by a voice coil motor 401. A suspension 406 is attached to the arm 405. A thermally-assisted magnetic recording head 410 with the LD100 or with the LD10 mounted over the slider 110 is connected to the tip of the suspension 406.

What is claimed is:

1. A thermally-assisted magnetic recording head, the magnetic recording head including an optical waveguide that is formed inside a slider and composed of a core and a cladding, the magnetic recording head comprising a first laser-beam absorber or reflector, the first absorber or reflector being disposed around the cladding of the optical waveguide, the first absorber or reflector being disposed in a manner surrounding the cladding of the optical waveguide, the first absorber or reflector in contact with the cladding of the optical waveguide, a portion of the first absorber or reflector in contact with the cladding being disposed closer to a central portion of the optical waveguide than other structures provided inside the slider;
wherein the first absorber or reflector surrounds all four sides of the cladding of the optical waveguide, and the first absorbers or reflectors disposed in a manner surrounding the four sides are interconnected in an annular shape.

2. The thermally-assisted magnetic recording head according to claim 1, wherein the first absorbers or reflectors disposed in a manner surrounding the four sides are of varied materials or thickness depending on the direction.

3. A thermally-assisted magnetic recording head, the magnetic recording head including an optical waveguide that is formed inside a slider and composed of a core and a cladding, the magnetic recording head comprising a first laser-beam absorber or reflector, the first absorber or reflector being disposed around the cladding of the optical waveguide, the first absorber or reflector being disposed in a manner surrounding the cladding of the optical waveguide, the first absorber or reflector in contact with the cladding of the optical waveguide, a portion of the first absorber or reflector in contact with the cladding being disposed closer to a central portion of the optical waveguide than other structures provided inside the slider;
wherein the first absorber or reflector is disposed in the vicinity of a light incident port of the optical waveguide formed inside the slider;
wherein the optical waveguide formed inside the slider includes a plurality of cores, the optical waveguide having a function of converting a laser beam into a spot size decreasing from the incident port of the optical waveguide toward an air bearing surface of the slider; and
a second absorber or reflector different from the first absorber or reflector is disposed along the optical waveguide between a magnetic pole magnetizing coil and the first absorber or reflector.

4. The thermally-assisted magnetic recording head according to claim 3, wherein the first absorber or reflector and the second absorber or reflector are each formed of the same material as the material of the magnetic pole magnetizing coil.

* * * * *